United States Patent
Kaneshiro et al.

(10) Patent No.: US 8,629,078 B2
(45) Date of Patent: Jan. 14, 2014

(54) COMPOSITE OXIDE FOR EXHAUST GAS PURIFYING CATALYST AND EXHAUST GAS PURIFYING CATALYST, AND DIESEL EXHAUST GAS PURIFYING FILTER

(75) Inventors: Yuki Kaneshiro, Tokyo (JP); Takuya Yano, Tokyo (JP); Akira Nagatomi, Tokyo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 855 days.

(21) Appl. No.: 12/312,869

(22) PCT Filed: Oct. 12, 2007

(86) PCT No.: PCT/JP2007/069950
§ 371 (c)(1),
(2), (4) Date: Jul. 13, 2009

(87) PCT Pub. No.: WO2008/065819
PCT Pub. Date: Jun. 5, 2008

(65) Prior Publication Data
US 2009/0288401 A1    Nov. 26, 2009

(30) Foreign Application Priority Data
Dec. 1, 2006  (JP) ................................. 2006-326161

(51) Int. Cl.
*B01J 23/10* (2006.01)
*B01D 53/94* (2006.01)

(52) U.S. Cl.
USPC ........................ 502/304; 422/177; 423/213.2

(58) Field of Classification Search
USPC ................. 502/304; 422/177, 180; 423/213.2
See application file for complete search history.

(56) References Cited

U.S. PATENT DOCUMENTS

3,857,899 A * 12/1974 Tasaka et al. ................. 568/804
2001/0022956 A1   9/2001 Okamoto et al.
2005/0282698 A1* 12/2005 Southward et al. ........... 502/304

FOREIGN PATENT DOCUMENTS

| EP | 1 250 952 A1 | 10/2002 |
|---|---|---|
| EP | 1 710 009 A1 | 10/2006 |
| JP | A-6-211525 | 8/1994 |
| JP | A-7-51544 | 2/1995 |
| JP | A-2001-9288 | 1/2001 |
| JP | A-2001-310131 | 11/2001 |
| JP | A 2002-97021 | 4/2002 |
| JP | A-2006-130444 | 5/2006 |
| JP | A-2006-272288 | 10/2006 |
| WO | WO 02/26379 A1 | 4/2002 |
| WO | WO 2005/085137 A1 | 9/2005 |

OTHER PUBLICATIONS

European Search Report issued in corresponding European Application No. 07829686.0, issued Dec. 15, 2009.
Oishi et al., "$CeO_2$-kei Fukugo Sankabutsu no Particulate Sanka Tokusei," Dai 97 Kai CatSJ Meeting Toronkai A Yokoshu, Mar. 19, 2006, p. 17.
Masui et al., "Cerium—Zirconium—Bismuth Fukugo Sankabutsu ni yoru Biryushi Carbon Nensho," Dai 94 Kai CatSJ Meeting Toronkai A Yokoshu, 2004, p. 10.

* cited by examiner

*Primary Examiner* — Jill Warden
*Assistant Examiner* — Joye L Woodard
(74) *Attorney, Agent, or Firm* — Oliff & Berridge, PLC

(57) ABSTRACT

To provide an oxidation catalyst capable of burning PM of diesel engine exhausts gas at a low temperature, and hardly subjected to poisoning due to sulfur oxide. A composite oxide contains Ce, Bi, and M (wherein M is one or more elements selected from Mg, Ca, Sr, and Ba) and oxygen, and is manufactured, with a molar ratio of Ce, Bi, M expressed by Ce:Bi:M=(1−x−y):x:y, satisfying $0<x\leq0.4$, and $0<y\leq0.4$. This composite oxide is suitable as a PM combustion catalyst, and is hardly subjected to poisoning due to sulfur oxide.

7 Claims, 1 Drawing Sheet

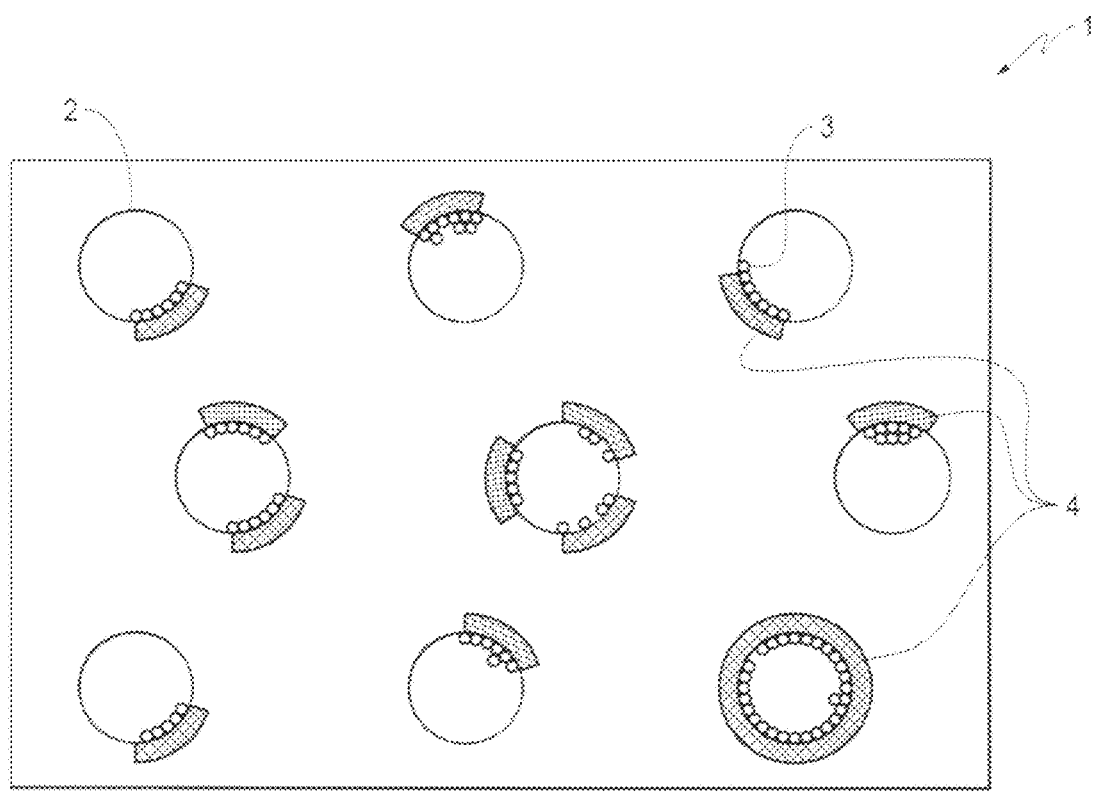

COMPOSITE OXIDE FOR EXHAUST GAS PURIFYING CATALYST AND EXHAUST GAS PURIFYING CATALYST, AND DIESEL EXHAUST GAS PURIFYING FILTER

TECHNICAL FIELD

The present invention relates to a composite oxide (oxide composed of a plurality of kinds of elements and oxygen) for purifying exhaust gas suitable for burning a particulate matter (described as PM in some cases hereunder) in an exhaust gas discharged from a diesel engine of an automobile, etc, and an exhaust gas purifying catalyst using the same, and a diesel exhaust gas purifying filter.

DESCRIPTION OF RELATED ART

As a general method of removing PM from exhaust gas of diesel engine there is a method of trapping PM by setting a diesel particulate filter on an exhaust gas passage, (described as DPF in some cases hereunder) made of porous ceramics, to thereby trap PM. Here, the PM is a fine particle mainly composed of carbon. Therefore, the PM trapped by the DPF is intermittently or sequentially burned, and the DPF is reproduced in a state before the PM is trapped. Then, a method of burning the PM by power burner combustion system from outside by an electric heater and a burner etc, and a method of setting an oxidation catalyst on the more engine side than the DPF and making NO contained in an exhaust gas turn into $NO_2$, to thereby burn the PM by an oxidizing power of the $NO_2$, are generally used in the DPF reproduction process.

Meanwhile, exhaust of nitrogen oxide ($NO_x$), hydrocarbon, and carbon monoxide can be given as a problem of the diesel engine exhaust gas. Then, each kind of oxidation catalyst is proposed, for the purpose of reducing these nitrogen oxide ($NO_x$), hydrocarbon, and carbon monoxide (see patent documents 1 to 3).

Patent document 1: Japanese Patent Laid Open Publication No. 2006-130444
Patent document 2: Japanese Patent Laid Open Publication No. 07-51544
Patent document 3: Japanese Patent Laid Open Publication No. 06-211525

BRIEF DESCRIPTION OF THE DRAWING

FIGURE shows an exemplary diesel exhaust gas purifying filter.

DISCLOSURE OF THE INVENTION

Problem to be Solved by the Invention

However, a power source must be installed at the outside, for using an electric heater and a burner for the DPF regeneration process, and a mechanism, etc, for securing and operating the power source is required separately. Therefore, a system itself is complicated. In addition, there are various problems to be solved in using the oxidation catalyst, such that an exhaust gas temperature is not so high as sufficiently exhibiting a catalytic activity of the oxidation catalyst, and a required amount of NO for PM combustion is not contained in the exhaust gas unless the diesel engine is set in a prescribed driving state.

Therefore, a method of making a catalyst that have an effect of decreasing a combustion temperature of the PM and catalytic action on the DPF, is considered by inventors of the present invention, as a desirable regeneration processing method of the DPF.

Therefore, inventors found that the catalytic action of burning PM by Pt is low at a temperature of a level close to the temperature of a level close to the exhaust gas temperature, in the oxidation catalyst, with Pt as the catalyst metal carried on alumina or ceria having a high specific surface area. Therefore, it is difficult to burn and remove the PM. Further, according to an examination by the inventors, there is also a problem that the catalytic activity is lowered by poisoning due to sulfur as will be described later.

Here, the lowering of the catalytic activity by poisoning due to sulfur will be described. A sulfur component is slightly contained in a fuel used in the diesel engine. A sulfur component in this fuel is burned in an engine, which is then turned into sulfur oxide and mixed into the exhaust gas. Therefore, the oxidation catalyst is exposed to the sulfur oxide in this exhaust gas for a long time. Then, reaction occurs between the surface and inside of the oxidation catalyst and the sulfur oxide in the exhaust gas, thus causing the lowering of the catalytic function (poisoning due to sulfur) to occur, resulting in an increase of the combustion temperature of the PM.

In view of such a circumstance, an object of the present invention is to provide the composite oxide for exhaust gas purifying catalyst and the exhaust gas purifying catalyst, and the diesel exhaust gas purifying filter, capable of burning the PM in the diesel engine exhaust gas at a further low temperature, and suppressing the lowering of the catalytic activity by sulfur in the exhaust gas (namely, having a high sulfur poisoning resistance).

Means for Solving the Problem

Inventors make every effect to solve the problems, it is found that the objects are achieved by the composite oxide containing Ce, Bi, M (wherein M is one kind or more elements selected from Mg, Ca, Sr, and Ba) and oxygen as constituent elements, or further preferably the composite oxide containing R (wherein R is one or more elements selected from Zr, Pr, and Tb) as a constituent element. Thus, the present invention is completed.

Namely, in order to solve the problem, a first aspect of the present invention provides a composite oxide for exhaust gas purifying catalyst, containing Ce, Bi, M (wherein M is one or more elements selected from Mg, Ca, Sr, and Ba) and oxygen.

A second aspect of the present invention provides a composite oxide for exhaust gas purifying catalyst, containing Ce, Bi, M (wherein M is one of more elements selected from Mg, Ca, Sr, and Ba), and R (wherein R is one or more elements selected from Zr, Pr, and Tb) and oxygen.

A third aspect of the present invention provides a composite oxide for exhaust gas purifying catalyst, containing Ce, Bi, M (wherein M is one or more elements selected from Mg, Ca, Sr, and Ba) and oxygen, with a molar ratio of Ce, Bi, M expressed by Ce:Bi:M=(1−x−y):x:y, satisfying $0<x\leq0.4$, and $0<y\leq0.4$.

A fourth aspect of the present invention provides a composite oxide for exhaust gas purifying catalyst, containing Ce. Bi, M (wherein M is one or more elements selected from Mg, Ca, Sr, and Ba), R (wherein R is one or more elements selected from Zr, Pr, and Tb), and oxygen, with a molar ratio of Ce. Bi, M, R expressed by Ce:Bi:M:R=(1−x−y−z):x:y:z, satisfying $0<x\leq0.4$, $0<y\leq0.4$, $0<z\leq0.5$, and $x+y+z<1$.

A fifth aspect of the present invention provides a composite oxide for exhaust gas purifying catalyst according to any one of the first to fourth aspects, further containing platinum-group elements.

A sixth aspect of the present invention provides an exhaust gas purifying catalyst, containing the composite oxide for exhaust gas purifying catalyst according to any one of the first to fifth aspects.

A seventh aspect of the present invention provides the exhaust gas purifying catalyst according to the sixth aspect, wherein the exhaust gas purifying catalyst is a catalyst of burning a particulate matter in a diesel engine exhaust gas.

An eighth aspect of the present invention provides a diesel exhaust gas purifying filter. As shown in FIGURE, an exemplary diesel exhaust gas purifying filter 1 having pores 2 for trapping particulate matter 3 present in diesel engine exhaust gas, wherein the composite oxide for exhaust gas purifying catalyst 4 according to any one of the first to fifth aspects exists at a part in the porous filter contacting with the particulate matter 3 trapped by the porous filter.

Advantage of the Invention

A composite oxide for exhaust gas purifying catalyst and an exhaust gas purifying oxidation catalyst according to the present invention are capable of burning PM at a lower temperature than a temperature for burning PM in a conventional catalyst. In addition, the composite oxide, or exhaust gas purifying catalyst, an exhaust gas purifying catalyst, and a diesel exhaust gas purifying filter is hardly poisoned by a sulfur oxide component contained in a diesel engine exhaust gas, compared with conventional catalyst and diesel exhaust gas purifying filter, and an excellent catalytic activity is maintained for a long time.

BEST MODE FOR CARRYING OUT THE INVENTION

Explanation will be given for the best mode for carrying out the invention, based on 1) Structure of a composite oxide for exhaust gas purifying catalyst, 2) Composition of decreasing a combustion temperature of PM, 3) Composition of suppressing lowering of a catalytic function by sulfur oxide contained in an exhaust gas. 4) Structure of an exhaust gas purifying catalyst, 5) An evaluation method of lowering the catalytic function by the sulfur oxide contained in the exhaust gas, 6) A manufacturing method of the composite oxide for exhaust gas purifying catalyst and exhaust gas purifying catalyst, and a diesel exhaust gas purifying filter, and 7) Conclusion, In this order.

1) The Structure of the Composite Oxide for Exhaust Gas Purifying Catalyst.

The composite oxide for exhaust gas purifying catalyst according to the present invention is the composite oxide containing Ce, Bi, M (wherein M is one or more elements selected from Mg, Ca, Sr, and Ba, and is abbreviated as M in some cases in this specification) as constituent elements, or is the composite oxide containing Ce, Bi, M, R (wherein R is one or more elements selected from Zr, Pr, and Tb, and is abbreviated as R in some cases in this specification) as constituent elements. Note that in the present invention, the composite oxide containing Ce, Bi, and M as constituent elements is described as [a-type], and the composite oxide containing Ce, Bi, M, R as constituent elements is described as [b-type], in some cases.

After examination by the inventors, it is found that the composite oxides of [a-type] and [b-type] according to the present invention have composite oxide phases, with a part of Ce of a cerium oxide structure having a fluorite type structure substituted with Bi, M, or Si, M, R.

2) The Structure of Decreasing the PM Combustion Temperature.

After examination by the inventors, it is found that by substituting a part of Ce with Bi in a structure of oxide having a cerium oxide structure and thereby having the structure of the composite oxide phase, it is possible to exhibit an effect of improving the catalytic activity in a low temperature range, namely, an effect of decreasing the combustion temperature of PM. Here, it is found that the effect of improving the catalytic activity in the low temperature range can be exhibited, even if an addition of Bi is relatively small. When Bi addition amount satisfies $x \leq 0.4$, with the molar ratio of Ce, Bi, M expressed by $Ce:Bi:M=(1-x-y):x:y$ in [a-type], and the molar ratio of Ce, Bi, M, R expressed by $Ce:Bi:M:R=(1-x-y-z):x\ y:z$ in [b-type], preferably it is possible to prevent melting of the composite oxide at the time of being exposed to a high temperature. It appears that this is because when the Bi addition amount satisfies $x \leq 0.4$, a PM combustion temperature in this composite oxide is not increased, even after the composite oxide is exposed to a high temperature for a long time due to continuance of burning of PM. As described above, a mixing ratio of Bi into the composite oxide is preferably set in a range of $0 < x \leq 0.4$ in [a-type] and [b-type].

3) The Structure of Suppressing Lowering of the Catalytic Action Due to Sulfur Oxide Contained in Exhaust Gas.

After examination by the inventors, it is found that the [a-type] composite oxide and the [b-type] composite oxide containing M having excellent durability can be obtained, even when being subjected to poisoning due to sulfur oxide for a long time, while maintaining the catalytic activity from a low temperature range, compared with Ce—Bi composite oxide containing only Ce and Bi as metal elements. Although there are many unclear points regarding its mechanism, it is so estimated that by causing an alkaline earth metal element M that coexists with Ce—Bi to selectively react with sulfur oxide, or adsorb the sulfur oxide thereon, the sulfur oxide is prevented from being reacted at an active point of the composite oxide or being adsorbed thereon, so deterioration of catalyst characteristics due to sulfur oxide is suppressed.

Even if addition of M is relatively small, an effect of improving an excellent sulfur poisoning resistance can be obtained. Even if the addition of M is increased, the effect of improving the sulfur poisoning resistance is substantially maintained. However, it is probable that the mixing ratio of Ce and Bi is relatively reduced in the composite oxide, and the PM combustion temperature is increased. In order to avoid such a circumstance, addition ratio of M is preferably set to be in a range of $0 < y \leq 0.4$ in both cases of [a-type] and [b-type].

In the present invention, it is also preferable that R, being one or more elements selected from Zr, Pr, and Tb is further added to Ce—Bi-M[a-type] as a fourth element, to thereby obtain Ce—Bi-M-R [b-type]. Addition of R is effective, because action of suppressing sintering of a primary particle is exhibited during sintering and a specific surface area of the composite oxide is increased. Increase of the specific surface area leads to an improvement of the catalytic activity. Accordingly, by addition of R, an effect of further decreasing the PM combustion temperature can be obtained. Here, even if the addition of R is relatively small, an effect of decreasing the PM combustion temperature can be obtained. Even if the addition of R is increased, the effect of decreasing the PM combustion temperature is substantially maintained. However, it can be so considered that the mixing ratio of Ce and Bi in the composite oxide is relatively reduced, and the PM combustion temperature is increased. In order to avoid such a circumstance, the addition ratio of R is preferably set to be in a range of $0 < z \leq 0.5$ in [b-type].

4) Composition of the Exhaust Gas Purifying Catalyst.

As described above, in the composite oxides of the [a-type] and [b-type], the molar ratio of a constituent metal element preferably satisfies the following relation. Namely, in the [a-type], when the molar ratio of Ce, Bi, M is expressed by Ce:Bi:M=(1−x−y):x:y, the relations of $0 < x \leq 0.4$, and $0 < y \leq 0.4$ are established. Also, in the [b-type], when the molar ratio of Ce, Bi, M, R is expressed by Ce:Bi:M:R=(1−x−y−z):x:y:z, relations of $0 < x \leq 0.4$, and $0 < y \leq 0.4$, $0 < z \leq 0.5$, and $x+y+z < 1$ are established.

Note that Bi, M or R, with Ce of the cerium oxide structure not substituted with them, sometimes exist in this composite oxide as an impurity phase. In this case also, existence of the impurity phase is tolerated, unless the effect of the present is not spoiled. Then, when a tolerable impurity phase exists, it is acceptable if the molar ratio as an entire body of the composite oxide including Ce, Bi, M, or R in this impurity phase satisfies the [a-type] and [b-type].

It is also preferable that the platinum-group elements are further added to the composite oxide according to the present invention. The platinum-group elements have an action of promoting an oxidation of a fuel and deficiency components when driving the engine, such as NO and CO contained in the exhaust gas. In addition, the effect of further decreasing the PM combustion temperature can be expected. Here, the platinum-group elements can coexist with the composite oxide of the present invention in a form of being contained in this composite oxide. Meanwhile, the platinum-group elements can also coexist with the composite oxide of the present invention, by being contained in a substance generally used as a catalyst carrier such as $Al_2O_3$, $TiO_2$, and $SiO_2$ then mixing this substance with the composite oxide of the present invention. In this case, one or more platinum-group elements (Pt, Rh, Pd, Ir, Ru, Os) can be used, and particularly Pt, Rh, and Pd are greatly effective in terms of improving a catalyst efficiency. An amount of the platinum-group elements is adjusted, so that content of the platinum-group elements is, for example, 0.05 to 5 mass % in the composite oxide of the present invention, or in a mixture of the composite oxide of the present invention and a catalyst carrier substance, when the catalyst carrier substance is further mixed into this composite oxide.

As a content form of the platinum-group elements, the following cases are considered. Namely, the platinum-group elements exist in a form of being adhered to a surface of a particle of the composite oxide, or the platinum-group elements exist in a form of being solid-solute in a crystal structure of the composite oxide. The exhaust gas purifying catalyst using the composite oxide having a structure of containing the platinum-group elements is suitable as a combustion catalyst of PM contained in a diesel engine exhaust gas.

5) The Characteristic Evaluation Method of the Composite Oxide for Exhaust Gas Purifying Catalyst.

As described above, it is requested that the PM can be burned at a further low temperature, and lowering of the catalytic function due to the sulfur oxide contained in the exhaust gas is suppressed. Therefore, the inventors examined an evaluation method of characteristics of the composite oxide, and therefore details thereof will be described hereunder.

In the evaluation of the characteristics of the composite oxide, the inventors found that it was straightforward and effective to make a sample of the manufactured composite oxide subjected to heat treatment (simply referred to as sulfur poisoning resistance processing or S-processing hereunder) for a long time in a sulfur-containing airstream, and evaluate whether there was a certain degree of change between the catalytic activity to the PM immediately after manufacturing the sample, and the catalytic activity to the PM after being subjected to sulfur poisoning resistance processing.

Therefore, next, the Inventors examined a method of evaluating the catalytic activity to the PM of the composite oxide, and found that the catalytic activity to the PM could be evaluated at the PM combustion temperature as will be described later. Namely, the PM combustion temperature, before and after sulfur poisoning resistance processing and the PM combustion temperature after sulfur poisoning resistance processing were measured, and a difference between these temperatures was examined. And based on this result, the inventors found that characteristics of temperature for burning PM by the composite oxide, and characteristics of lowering the catalytic activity by the sulfur poisoning could be simultaneously measured.

As a method of performing sulfur poisoning resistance processing, the composite oxide of the present invention was subjected to the processing for 50 hours at 300° C. in an air stream containing sulfur, and then is subjected to heat treatment for 2 hours at 600° C. under atmosphere. Note that a condition for performing heat treatment for 2 hours at 600° C. under atmosphere is determined on the assumption of the condition of temperature for performing regeneration processing of DPF by burning PM trapped on the DPF. Then, the PM combustion temperature after sulfur poisoning resistance processing was measured, and a difference of temperature between before and after sulfur poisoning resistance processing was obtained. In this specification, the difference of the PM combustion temperature before/after sulfur poisoning resistance processing is described as a sulfur resistance index ΔT (ΔT=The PM combustion temperature of samples prepared by 50 hours at 300° C. in an air stream containing sulfur, and then is subjected to heat treatment for 2 hours at 600° C.)−(PM combustion temperature before sulfur poisoning resistance processing).

In this composite oxide, excellent characteristics as the catalyst of the composite oxide are shown by a low PM combustion temperature and a small value of the sulfur resistance index ΔT. From a practical viewpoint, when this composite oxide is used as the PM combustion catalyst, the sulfur resistance index ΔT is preferably set to be 40° C. or less, and more preferably set to be 20° C. or less.

The inventors manufactured the composite oxide having various compositions containing Ce, Bi, and M, being a third element, as constituent elements. Then, the sample of the composite oxide thus manufactured was poisoned by sulfur by the aforementioned method, and a relation between each constituent element and the sulfur resistance index ΔT was evaluated. As a result, it was found that in order to improve sulfur poisoning property in the composite oxide containing Ce—Bi as constituent elements, it was extremely effective that M was added as the third element, to thereby obtain Ce—Bi-M[a-type] or R was further added as the fourth element, to thereby obtain Ce—Bi-M-R[b-type].

6) The Manufacturing Method of the Composite Oxide for Exhaust Gas Purifying Catalyst and Exhaust Gas Purifying Catalyst, and a Diesel Exhaust Gas Purifying Filter.

The composite oxide, being a target of the present invention, can be suitably synthesized by a method of burning a precipitate obtained by a wet-type method, in both cases of the [a-type] and [b-type]. For example, water-soluble salt of Ce, water-soluble salt of Bi, and water-soluble salt of M (such as Sr), or further water-soluble salt of R (such as Zr) are precipitated by a precipitating agent, then this precipitate is dried, to thereby obtain a "recursor", and this precursor is subjected to heat treatment, to thereby synthesize [a-type] or [b-type] composite oxide.

Specifically, as a precipitating agent, carbonic acid and alkali are added to an aqueous solution in which water-soluble salt of Ce (such as nitrate salt), water-soluble salt of Bi (such as nitrate salt), water-soluble salt of M (such as nitrate salt), or further water-soluble salt of R (such as nitrate salt) are dissolved, to thereby cause reaction, and the precipitate thus obtained is filtered, washed, and dried, to thereby obtain the precursor. An upper limit of ion concentrations of Ce, Bi, and M in a solution to produce the precipitate are determined by solubility of the aforementioned water-soluble salts. However, these ion concentrations are preferably set to be concentrations capable of allowing uniform reaction to occur during stirring and preventing an excess load from being added on an apparatus during stirring because viscosity of a reaction solution becomes excessively high.

In order to obtain the precipitate of each element, it is recommended to use alkaline carbonate as the precipitating agent. Particularly the water-soluble salt of M is hardly precipitated only in the alkali solution, and therefore by using the alkali solution and the carbonic acid as the precipitating agent, water-soluble salt of M is precipitated as carbonate salt. As specific examples of this alkaline carbonate, substances mainly composed of carbonate-based substances such as carbonated water, carbon dioxide gas, sodium carbonate, potassium carbonate, sodium hydrogen carbonate, and each water-soluble salt of ammonia water or ammonium are mixed and used, or ammonium carbonate compound having both functions of the carbonate-based substance and ammonium-based water-soluble salt, specifically such as ammonium carbonate and ammonium hydrogen carbonate are preferably used. Urea is contained in a salt solution, then this salt solution is heated to decompose the urea, to thereby generate ammonia and carbonic acid. Therefore, it is also possible to obtain the precipitate by alkalifying a salt solution, pH of the solution at the time of generating the precipitate is preferably controlled to a range of 6 to 11. In a region of 6 or more of pH, Bi and Ce and M[a-type] or, Bi and Ce and M and R[b-type] are preferably co-precipitated.

In addition, compounds that can be hydrolyzed are prepared, as a Ce compound, a Bi compound, a M compound, or further R compound, respectively, and by adding water thereto and hydrolyzing them, a mixed sol is also formed, which can be then agglutinated and precipitated. As the compound that can be hydrolyzed, alkoxide and β-keto acid salt of each metal element can be given, for example.

The obtained precipitate is filtered and washed by water as needed, and is subjected to vacuum drying and through-circulation drying, to thereby obtain the precursor. At this time, in order to improve dehydration efficiency by drying, this precipitate can be dried in a form immediately after being filtered, or can be dried after being granulated into a prescribed shape. Thereafter, by applying heat treatment (sintering) to the precursor in a form of a powder shape or in a state of being granulated, for example at 400 to 1000° C. or preferably at 500 to 850° C., a target [a-type] or [b-type] composite oxide can be synthesized. An atmosphere during sintering is not particularly limited, provided that a condition capable of generating the composite oxide is satisfied, and for example, an atmosphere such as air, nitrogen, argon, and vapor combined with them can be used.

When the platinum-group elements are contained in the [a-type] or [b-type] composite oxide according to the present invention, for example, it is possible to adopt a technique of impregnating the composite oxide after sintering with salt or complex containing an aimed amount of platinum-group elements, which is then dried and sintered.

By using the [a-type] or [b-type] composite oxide of in the exhaust gas purifying catalyst, the diesel exhaust gas purifying filter can be constructed by the same technique as conventional. In addition, by mixing the composite oxide of the present invention with powders such as $Al_2O_3$, $TiO_2$, and $SiO_2$, the [a-type] or [b-type] exhaust gas purifying catalyst is constructed, and by using this [a-type] or [b-type] exhaust gas purifying catalyst, an [a-type] or [b-type] diesel exhaust gas purifying filter can be constructed. In any case, the composite oxide of the present invention is placed at a part contacting with trapped PM, in a porous body formed in this diesel exhaust gas purifying filter. Further, it is also acceptable to constitute the exhaust gas purifying catalyst, by mixing the composite oxide of the present invention and substances such as $Al_2O_3$, $TiO_2$, and $SiO_2$ containing the platinum-group elements.

7) Conclusion.

It was found that the composite oxide had excellent sulfur resistance, with PM combustion temperature set to be a low temperature, specifically 380° C. or less, and sulfur resistance index ΔT set to be 20° C. or less, and had excellent characteristics as the composite oxide for exhaust gas purifying catalyst. As a result, by using the composite oxide for the exhaust gas purifying catalyst, heat added to DPF can be reduced because PM is burned. Therefore, heat added to the DPF for burning PM can be reduced and this effect can be maintained for a long time. Accordingly, by applying the diesel exhaust gas purifying filter to the diesel engine, with this composite oxide set as the exhaust gas purifying catalyst, reduction of fuel was possible, then fuel economy was improved, and simultaneously reduction of thermal load to each kind of member of exhaust gas-system could be realized. Then, the mileage was improved because fuel consumption was lessened, and reduction of thermal load to each parts of exhaust gas-system could be realized. Further, simplification and compactness are realized by equipment of thermal energy supplied for DPF.

Further, when the composite oxide for exhaust gas purifying catalyst and the exhaust gas purifying oxidation catalyst not containing noble metal elements are used, it is also possible to obtain an effect of reducing a material cost of a catalyst substance used in the DPF. Meanwhile, in a case of using the composite oxide for exhaust gas purifying catalyst and the exhaust gas purifying oxidation catalyst containing noble metal elements, it was found that the PM combustion temperature could be further decreased, and an activity of promoting oxidation of the fuel and deficiency when driving the engine such as NO and CO contained in the exhaust gas could be exhibited.

EXAMPLES

The present invention will be specifically described, with reference to examples. <<manufacture of the composite oxide>>

The composite oxide according to each example and comparative example was manufactured as follows:

Examples 1 to 3

Cerium nitrate hexahydrate ($Ce(NO_3)_3 \cdot 6H_2O$) as a Ce source, and bismuth nitrate petahydrate ($Bi(NO_3)_3 5H_2O$) as a Bi source were prepared. Meanwhile, as a source of element M, alkaline earth nitrate salt (example 1: calcium nitrate ($Ca(NO_3)_2$), example 1: strontium nitrate ($Sr(NO_3)_2$), example 3: barium nitrate ($Ba(NO_3)_2$)) were prepared.

Each nitrate salt was mixed, in the mixing ratio so that the molar ratio of Ce, Bi, M was 0.8:0.1:0.1, and water was added so that total of Ce, Bi, M in the mixed solution of nitric acid was 0.2 mol/L, to thereby obtain a solution of raw materials. Then, an aqueous solution of ammonium carbonate was added as a precipitating agent, while stirring this solution. Thereafter, precipitating reaction was sufficiently advanced, by continuing stirring of the solution for 30 minutes. The obtained precipitate was filtered and washed by water, then dried for about 15 hours at 125° C., to thereby obtain a dried powder. The obtained dried powder was set as a precursor. Next, this precursor was sintered for 2 hours at 800° C. under an air atmosphere, to thereby obtain the composite oxide, with Ce, Bi, and M (element M is Ca in example 1, element M is Sr in example 2, and element M is Ba in example 3) as constituent elements.

Examples 4 and 5

In the same way as the example 2, the Ce source, the Bi source, and the Sr source were prepared. Further, as a source of element R, oxyzirconlum nitrate dihydrate ($ZrO(NO_3)_2 \cdot 2H_2O$) was prepared in example 4, and a solution of praseodymium nitrate in which praseodymium oxide is dissolved in a solution of nitric acid was prepared in example 5. They were mixed in the mixing ratio so that the molar ratio of Ce, Si, Sr, R was 0.7:0.1:0.1:0:0.1, and water was added so that the total of Ce, Bi, Sr, R in the mixed solution of nitric acid was 0.2 mol/L, to thereby obtain the solution of raw materials. Under the same step and condition as those of example 1, the composite oxide of example 4, with Ce, Bi, Sr, Zr set as constitutional elements, and the composite oxide of example 5, with Ce, Bi, Sr, Pr set as constitutional elements were obtained.

Examples 6 to 10

In the same way as the composite oxide of example 2, the composite oxides of examples 6 to 10 were manufactured by changing the molar ratio of Ce, Bi, Sr. Note that the molar ratio of Ce, Bi, Sr of the composite oxides of examples 6 to 10 is shown in table 2.

Comparative Example 1

Cerium nitrate hexahydrate ($Ce(NO_3)_3 \cdot 6H_2O$) and bismuth nitrate petahydrate ($Bi(NO_3)_3 \cdot 5H_2O$) were weighed, so that the molar ratio of Ce and Bi was 0.9:0.1, which were then dissolved into the solution of nitric acid, then water was added so that the total of Ce and Bi in the mixed solution of nitric acid was 0.2 mol/L, to thereby obtain the solution of raw materials. Under the same step and condition as those of example 1, the composite oxide of comparative example 1, with Ce and Bi set as constitutional elements, was obtained.

Comparative Example 2

Hexahydrate ($Ce(NO_3)_3 \cdot 6H_2O$) and strontium nitrate ($Sr(NO_3)_2$) were weighed so that the molar ratio of Ce and Sr was 0.9:0.1, which were then dissolved into the solution of nitric acid, then water was added so that the total of Ce and Sr in the mixed solution of nitric acid was 0.2 mol/L, to thereby obtain the solution of raw materials. Under the same step and condition as those of example 1, the composite oxide of comparative example 2, with Ce and Sr set as constitutional elements, was obtained.

<<Manufacture of a sample of sulfur poisoning resistance evaluation >> In order to evaluate the sulfur poisoning resistance of the obtained composite oxides of examples 1 to 10 and comparative examples 1 and 2, a part of each composite oxide was subjected to heat treatment for 50 hours at 300° C. in an electric furnace through which gas containing sulfur oxide is flown, and was further subjected to heat treatment for 2 hours at 600° C. in the atmospheric air. Note that as a gas composition containing the sulfur oxide, nitrogen gas containing 200 ppm of $SO_2$, 10% of $O_2$, and 10% of $H_2O$ was used, with flow rate of the gas set to be 0.5 L/min.

<<Measurement of BET specific surface area>> A sample before sulfur-processing obtained by each example and comparative example was disaggregated by an agate mortar, then was turned into a powder state, and a specific surface area was obtained by a BET method. Measurement was performed by using 4 SORB US by YUASA-IONICS COMPANY, LIMITED.

<<Evaluation of PM combustion temperature>> Mixed powders of the sample obtained by each example and comparative example, the sample after sulfur poisoning resistance processing, and carbon black were manufactured. A specified amount of a part of each mixed powders is splitted, and the PM combustion temperature was evaluated by obtaining a change of weight during heating the sample which was mixed with carbon black, by using a TG/DTA device. Specifically, evaluation was made as follows.

Commercially available carbon black (having average particle size of 2.09 μm by MITSUBISHI CHEMICAL CORPORATION) was prepared as a simulated PM. Then, powders of composite oxide samples of examples 1 to 10, and comparative examples 1 and 2, and this carbon black were weighed so that the mass ratio was 6:1, which were then mixed for 20 minutes by an automatic mortar machine (AGA type by ISHIKAWA KOJO), to thereby obtain a mixed powder sample in which carbon black and each sample powder were mixed. This mixed powder sample 20 mg was set in a TG/DTA equipment (TG/DTA6300 type by Seiko Instruments, Inc.), and a temperature was increased in the atmospheric air from a normal temperature to 700° C. at a temperature increase rate of 10° C./min, and weight reduction amount was measured (wherein, carbon black was discharged to outside the system as carbon dioxide by combustion, and therefore the carbon black had a tendency of reduction from initial weight). Then, the temperature of a point where a peak of a DTA curve was maximum (point where weight reduction occurs most rapidly in a TG curve) was set as the PM combustion temperature.

In addition, the sulfur resistance index ΔT was calculated from a difference between the PM combustion temperature of the sample after sulfur poisoning resistance processing and the PM combustion temperature of the sample before sulfur poisoning resistance processing.

<<Regarding a measurement result>> Regarding the composite oxides of examples 1 to 5, and comparative examples 1 and 2, the molar ratio of constituent elements, the specific surface area, and the PM combustion temperature are shown in table 1.

TABLE 1

| | Constituent elements (molar ratio) | | | | BET ($m^2/g$) | PM combustion temperature (° C.) | | |
|---|---|---|---|---|---|---|---|---|
| | Ce | Bi | Element M | Element R | | Before S-processing | After S-processing | ΔT |
| Example 1 | 0.8 | 0.1 | Ca: 0.1 | — | 31.4 | 379 | 390 | 11 |
| Example 2 | 0.8 | 0.1 | Sr: 0.1 | — | 30.3 | 372 | 376 | 4 |
| Example 3 | 0.8 | 0.1 | Ba: 0.1 | — | 17.2 | 366 | 382 | 16 |
| Example 4 | 0.7 | 0.1 | Sr: 0.1 | Zr: 0.1 | 35.7 | 368 | 388 | 20 |
| Example 5 | 0.7 | 0.1 | Sr: 0.1 | Pr: 0.1 | 32.4 | 353 | 372 | 19 |
| Comparative example 1 | 0.9 | 0.1 | — | — | 24.3 | 353 | 491 | 138 |
| Comparative example 2 | 0.9 | — | Sr: 0.1 | — | 20.6 | 384 | 434 | 50 |

As is clarified from the table 1, when Ce—Bi-M composite oxides of examples 1 to 3, Ce—Bi-M-Zr composite oxides of example 4, and Ce—Bi-M-Pr composite oxides of example 5 were compared with Ce—Bi composite oxide of comparative example 1, with element M not set as the constituent element, although the combustion temperature before sulfur poisoning resistance processing was slightly increased, ΔT was tremendously reduced to 20° C. or less from 138° C. of comparative example 1. In addition, regarding Ce—Sr composite oxide of comparative example 2, with Bi not set as the constituent element, the combustion temperature before sulfur poisoning resistance processing was high, and ΔT was 50° C., and it was found that the Ce—Sr composite oxide was easily subjected to sulfur poisoning, compared with the composite oxides of examples 1 to 5. As a result, it was found that composite oxides of Ce—Bi-M of examples 1 to 3, Ce—Bi-M-Zr of example 4, and Ce—Bi-M-Pr of example 5 could function as the exhaust gas purifying catalyst capable of reducing the PM combustion temperature and also exhibiting sulfur poisoning resistance property. Further, from a comparison of BET values among example 2 (Zr was not added) [a-type], example 4 (Zr was added) [b-type], example 5 (Pr was added) [b-type], it was found that Zr and Pr, being the element R, had a function of increasing the specific surface area of the composite oxide. It can be so considered that by this increase of the specific surface area of the composite oxide by Zr and Pr, the reduction of the PM combustion temperature was caused.

Next, regarding the composite oxides of the aforementioned example 2, and examples 6 to 10, the molar ratio of the constituent element and the PM combustion temperature are shown in table 2.

TABLE 2

| | Constituent element (molar ratio) | | | PM combustion temperature (° C.) | | |
|---|---|---|---|---|---|---|
| | Ce | Bi | Element M:Sr | Before S-processing | After S-processing | ΔT |
| Example 2 | 0.8 | 0.1 | 0.1 | 372 | 376 | 4 |
| Example 6 | 0.7 | 0.1 | 0.2 | 370 | 385 | 15 |
| Example 7 | 0.6 | 0.1 | 0.3 | 378 | 380 | 2 |
| Example 8 | 0.7 | 0.2 | 0.1 | 366 | 370 | 4 |
| Example 9 | 0.6 | 0.2 | 0.2 | 364 | 378 | 14 |
| Example 10 | 0.5 | 0.3 | 0.2 | 352 | 355 | 3 |

As is clarified from table 2, it was confirmed that Ce—Bi—Sr composite oxides of examples 2, 6 to 10 having the composition of [a-type], had excellent sulfur poisoning resistance property, wherein the PM combustion temperature after sulfur poisoning resistance processing was low and ΔT was also significantly below 20° C., compared with the composite oxide of comparative example 1 (M was not added) of table 1. Accordingly, it was found that composite oxides of examples 2, 6 to 10, with the molar ratio of Ce set in a range of 0.6 to 0.9, the molar ratio of Bi set in a range of 0.1 to 0.3, and the molar ratio of Sr, being the element M, set in a range of 0.1 to 0.3, could function as the exhaust gas purifying catalyst capable of reducing the PM combustion temperature and also exhibiting the sulfur poisoning resistance property.

Examples 11, 12

The platinum-group elements were carried on the composite oxide of example 2. In example 11, 2.35 g of a dinitrodiammine platinum nitric acid solution having 8.49 mass % of Pt concentration was added to 20 g of the composite oxide manufactured in example 2, which was then evaporated, dried, and sintered for 1 hour at 600° C., to thereby manufacture the composite oxide carrying the platinum-group elements of example 11. Also, in example 12, 3.8 g of palladium nitrate solution having 5.27 mass % of Pd concentration was added to the 20 g of composite oxide manufactured in example 2, which was then evaporated, dried, and sintered for 1 hour at 600° C., to thereby manufacture the composite oxide carrying the platinum-group elements of example 12. Regarding the manufactured composite oxides carrying the platinum-group elements of examples 11 and 12, the specific surface area and the PM combustion temperature before and after the sulfur poisoning resistance processing, were examined in the same technique as that of example 2. Results are shown in table 3. Note that in table 3, the results of example 2 are shown in table 3 in parallel. Further, when the composite oxides carrying the platinum-group elements of examples 11 and 12 were analyzed by ICP, Pt content of example 11 was 1.0 mass %, Pd content of example 12 was 1.0 mass %. Here, the PM combustion temperatures of the composite oxides of the aforementioned example 2, and examples 11 and 12 are shown in table 3.

TABLE 3

| | Platinum-group elements | PM combustion temperature (° C.) | | |
|---|---|---|---|---|
| | | Before S-processing | After S-processing | ΔT |
| Example 2 | — | 372 | 376 | 4 |
| Example 11 | Pt | 364 | 366 | 2 |
| Example 12 | Pd | 366 | 369 | 3 |

As is clarified from table 3, regarding the composite oxides carrying the platinum-group elements of examples 11 and 12, the PM combustion temperature before and after sulfur poisoning resistance processing was lower than that of example 2, and ΔT was a sufficiently small value such as 2 to 3° C. Accordingly, it was found that the composite oxides of examples 11 and 12 could function as the exhaust gas purifying catalyst capable of reducing the PM combustion temperature and also exhibiting the sulfur poisoning resistance property.

The invention claimed is:

1. A composite oxide for exhaust gas purifying catalyst, consisting of Ce, Bi, M, R, and oxygen, with a molar ratio of Ce, Bi, M, and R expressed by Ce:Bi:M:R=(1−x−y−z):x:y:z, satisfying $0<x\le 0.4$, $0<y\le 0.4$, $0<z\le 0.5$, and $x+y+z<1$,
wherein:
M is one or more elements selected from the group consisting of Ca and Sr; and
R is one or more elements selected from the group consisting of Pr and Tb.

2. A composite oxide for exhaust gas purifying catalyst, consisting of Ce, Bi, M, and oxygen, with a molar ratio of Ce, Bi, and M expressed by Ce:Bi:M=(1−x−y):x:y, satisfying $0<x\le 0.4$, and $0<y\le 0.4$,
wherein:
M is one or more elements selected from the group consisting of Ca and Sr.

3. A diesel exhaust gas purifying filter, having a porous filter for trapping a particulate matter in a diesel engine exhaust gas, wherein the composite oxide for exhaust gas purifying catalyst according to claim 2 exists at a part in the porous filter contacting with the particulate matter trapped by the porous filter.

4. The composite oxide for exhaust gas purifying catalyst according to claim 2, wherein a sulfur resistance index ΔT of the composite oxide is 20° C. or less.

5. An exhaust gas purifying catalyst comprising a catalyst carrier substance and the composite oxide for exhaust gas purifying catalyst according to claim 2.

6. The exhaust gas purifying catalyst according to claim 5, wherein the exhaust gas purifying catalyst is a catalyst for burning a particulate matter in a diesel engine exhaust gas.

7. A method for burning a particulate matter in a diesel engine exhaust gas comprising:
passing diesel engine exhaust gas through a diesel exhaust gas purifying filter, wherein
the diesel exhaust gas purifying filter contains the exhaust gas purifying catalyst of claim 5.

* * * * *